United States Patent [19]
Sano et al.

[11] Patent Number: 5,505,086
[45] Date of Patent: Apr. 9, 1996

[54] METHOD AND APPARATUS FOR MEASURING LENGTH OF CONDUIT AND FOR DIAGNOSING INSIDE OF CONDUIT

[75] Inventors: Hiroaki Sano; Kinji Taguchi; Shigeru Tanaka, all of Kanagawa; Tetsuro Yabuta; Takeshi Tsujimura, both of Ibaraki, all of Japan

[73] Assignees: Sumitomo Electric Industries, Ltd., Osaka; Nippon Telegraph & Telephone Corp., Tokyo, Japan

[21] Appl. No.: 115,686

[22] Filed: Sep. 3, 1993

[30] Foreign Application Priority Data

Sep. 4, 1992 [JP] Japan .................................. 4-236746
Nov. 9, 1992 [JP] Japan .................................. 4-298533
Dec. 28, 1992 [JP] Japan .................................. 4-348119
Jun. 1, 1993 [JP] Japan .................................. 5-130178

[51] Int. Cl.$^6$ ................................................ G01N 29/04
[52] U.S. Cl. ........................ 73/592; 73/597; 33/719; 33/757; 33/DIG. 2; 324/206
[58] Field of Search .......................... 73/592, 584, 602, 73/865.8, 597, 151.5, 155; 33/716, 714, 715, 719, 757, 544, DIG. 2, 701; 324/206

[56] References Cited

U.S. PATENT DOCUMENTS

| | | | |
|---|---|---|---|
| 4,014,102 | 3/1977 | Haga et al. ............................ | 33/126 |
| 4,597,183 | 7/1986 | Broding .................................. | 324/206 |
| 4,702,010 | 10/1987 | Elbracht ................................. | 33/544 |
| 4,852,262 | 8/1989 | Babcock et al. ...................... | 33/DIG. 2 |
| 4,852,407 | 8/1989 | Komine et al. ........................ | 73/597 |
| 4,930,350 | 6/1990 | Bode et al. ............................. | 73/597 |
| 4,935,884 | 6/1990 | Hajicek .................................. | 73/631 |
| 5,084,764 | 1/1992 | Day ........................................ | 73/865.8 |
| 5,205,048 | 4/1993 | Toomey et al. ....................... | 33/544 |
| 5,243,128 | 9/1993 | Marcoz .................................. | 324/206 |

*Primary Examiner*—Hezron E. Williams
*Assistant Examiner*—Helen C. Kwok
*Attorney, Agent, or Firm*—Cushman Darby & Cushman

[57] ABSTRACT

A method of measuring a length of a conduit comprises the steps of: supplying air into a conduit to insert a filamentary body into the conduit by flow of the air; detecting arrival of a forward end of the filamentary body at an outlet of the conduit; and measuring the length of the conduit from the length of the filamentary body inserted into the conduit. An apparatus for measuring a length of a conduit, comprises an air supply device for supplying air into the conduit; a filamentary body including a wire and a plurality of elastic large-diameter members attached to the wire; and a device for detecting that a forward end of the filamentary body arrives at an outlet end of the conduit, where the length of the conduit is measured from the length of the filamentary body inserted into the conduit.

4 Claims, 4 Drawing Sheets

METHOD AND APPARATUS FOR MEASURING LENGTH OF CONDUIT AND FOR DIAGNOSING INSIDE OF CONDUIT

BACKGROUND OF THE INVENTION

1. Field of the Invention

The present invention relates to a method and an apparatus for measuring the length of a buried conduit in advance when a cable is to be laid in the conduit, and also to a method and apparatus for diagnosing the inside of the conduit.

2. Description of the Related Art

As an infrastructure of a communication network in a high information society, heavy construction of user's optical lines is being advanced in order to make all up to general homes optical. Conventionally, in the case where optical cables are laid under the ground, such a method has been adopted that the cables are once inserted into a conduit, and thereafter are connected by welding optical fibers of the respective cables with each other. Working must be extremely simplified in order to realize huge construction of equipments to lead optical fibers from stations to respective homes, and in stead of such a method of connection by welding which takes a long time, such a method in which connectors are attached to opposite ends of every cable in advance so that connections are performed entirely through the connectors has been tried (1990, Paper of The Meeting of The Association of Electric/Information Related Societies: pp. 1–6).

In the case where a cable having connectors attached onto its opposite ends is to be laid in a long conduit, the cable cannot be used if it is shorter than the conduit. On the other hand, if it is longer than the conduit, it is necessary to uselessly dispose of the excess length of the cable in a manhole. It is therefore necessary to accurately measure the length of a conduit between manholes in advance. This technique has not yet been developed.

SUMMARY OF THE INVENTION

The present invention has been made to solve the above problems, and therefore it is an object of the present invention to provide a method of measuring the length of a conduit between manholes with accuracy.

Another object of the invention is to provide a method of diagnosing a state inside of the conduit.

Still another object of the invention is to provide an apparatus for performing the above methods.

To perform the above objects, the present invention provides a method of measuring a length of a conduit comprising the steps of: supplying air into said conduit to insert a filamentary body into said conduit by flow of the air; detecting arrival of a forward end of said filamentary body at an outlet of said conduit; and measuring the length of said conduit from the length of said filamentary body inserted into said conduit wherein said filamentary body is comprised of a wire and a plurality of large-diameter members attached to said wire at predetermined intervals. The present invention also provides an apparatus therefor.

The large-diameter members act to make a filamentary body advance by means of the flow of air flowing around the large-diameter members, disturb the air flow in the surrounding to vibrate the filamentary body to thereby reduce the resistance due to contact of the filamentary body with a conduit, an already-laid cable or the like, and prevents occurrence of such a problem that the filamentary body encroaches into a space between the conduit and a laid cable or the like if any to interfere with the insertion.

Further, according to the present invention, a guide pipe is provided at an inlet of the conduit, through which the filamentary body is fed into said conduit by means of the air flow.

Further, according to the present invention, in the method of diagnosing the inside of a conduit having air flow while inserting a filamentary body thereto, a sound of the air flow is received through a microphone attached to the forward end of the filamentary body so that the state inside the conduit is detected from the change of the received sound to thereby diagnose the inside of the conduit, and so that, at the same time, the position of the forward end of the filamentary body is confirmed to thereby measure the length of the conduit.

DETAILED DESCRIPTION OF THE PREFERRED EMBODIMENTS

Figure 1:
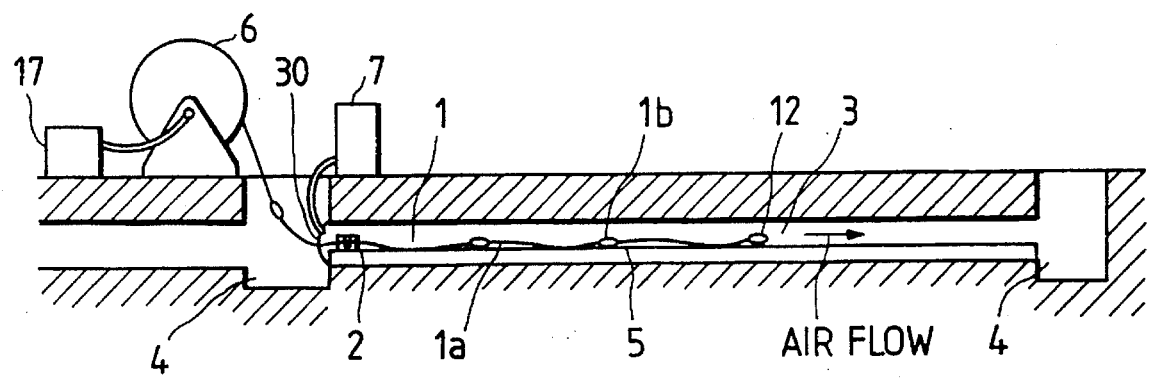
FIG. 1 is an explanatory diagram of a conduit length measuring apparatus according to an embodiment of the present invention.

FIG. 1 is an explanatory diagram showing an apparatus and for measuring the length of a conduit according to an embodiment of the present invention.

In FIG. 1, reference numeral 1 represents a linear material such as a filamentary body constituted by a wire 1a with large-diameter members 1b attached thereto; 2, a driving device for pulling the filamentary body 1 into a conduit 3 while supporting the large-diameter members 1b of the filamentary body 1; 4, manholes; 5, a laid cable; 6, a drum on which the filamentary body is wound; 7, a compressor for feeding air into the conduit 3; 12, a downsized microphone; 17, a receiving device for amplifying and indicating a signal from the microphone 12; and a seal 30 provided on the inlet side of the conduit 3 for preventing the air from flowing backward. In this case, the conduit 3 is formed of a hard vinyl circular pipe which has an inner diameter of 83 mm and which is buried over a distance of 200 m between the manholes 4 at a depth of 1.2 m in the underground. In this embodiment, a communication cable with a polyethylene coating having an outer diameter of 40 mm is already laid as the laid cable 5 in the conduit 3. The case of measuring the length of this conduit according to the present invention will be described.

Figure 2A:
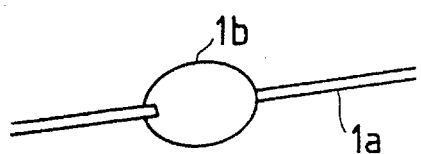
FIGS. 2(a) to 2(c) are a conceptual diagram illustrating the filamentary body applied to the present invention, respectively.
Figure 2B:
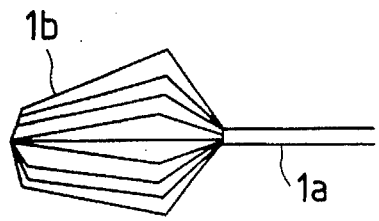
Figure 2C:
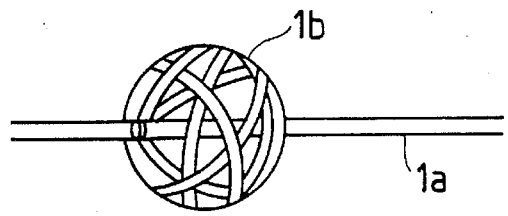

The filamentary body 1 is comprised of a wire 1a having an outer diameter of 2 mm and the large-diameter members 1b attached to the wire 1a at intervals of 5 m. The wire 1a is comprised of two insulated conductors which are coated with foamed polyethylene to have an outer diameter of 2 mm, and the large-diameter members 1b is formed of polyethylene foamed by about 50% and shaped into an elongated circle, as shown in FIG. 2(a), which has a length of 40 mm and a diameter of 25 mm. The downsized microphone 12 is attached to the large-diameter member 1b provided on the forward end of the filamentary body 1. Each of the large-diameter members 1b is made to have such a size that the filamentary body 1 does not encroach between the conduit 3 and the laid cable 5, and to be light and elastic enough to float while vibrating with a stronger air stream given thereto. Therefore, the shape and size of the large-diameter member 1b are determined depending on the relationship between a conduit 3 and a laid cable 5. In FIG. 2(b), there is shown the large-diameter member 1b comprised of a combination of spring materials and attached to the forward end of a filamentary body 1. On the other hand, in FIG. 2(c), the large-diameter member 1b is comprised of polypropylene tapes which are knitted into a shape of a spherical cage.

Figure 4:
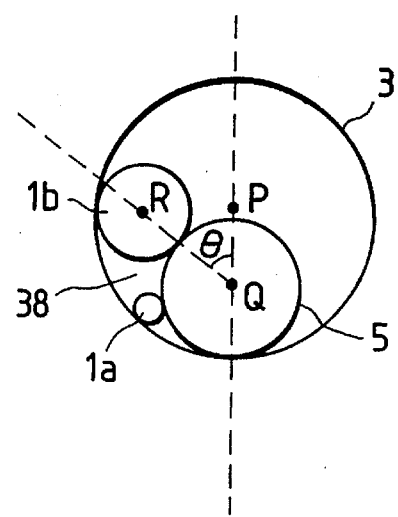
FIG. 4 is a diagram showing the relationship among the conduit, the laid cable, and the large-diameter member.

FIG. 4 is a sectional view showing an example of the case of insertion of a filamentary body 1 having a large-diameter member 1b attached thereto when there is a laid cable 5 in a conduit 3. In this case, if there is no large-diameter member 1b, large resistance is produced because a wire 1a encroaches in a space 38 to make it difficult to insert the filamentary body 1.

It is therefore necessary to provide a large-diameter member 1b having a predetermined size in connection with a laid cable 5. That is, in FIG. 4, it is necessary to select the diameter of the large-diameter member 1b to such a size that the angle θ between a straight line passing through the center R of the large-diameter member 1b and the center Q of the laid cable 5 and a reference straight line passing through the center Q and the center P of the conduit 3 is not larger than 45°. Such a large-diameter member 1b cannot encroach in the space 38, and in case where the wire 1a falls into the space 38, it cannot encroach therein since the large-diameter member 1b advances while vibrating.

Figure 3:
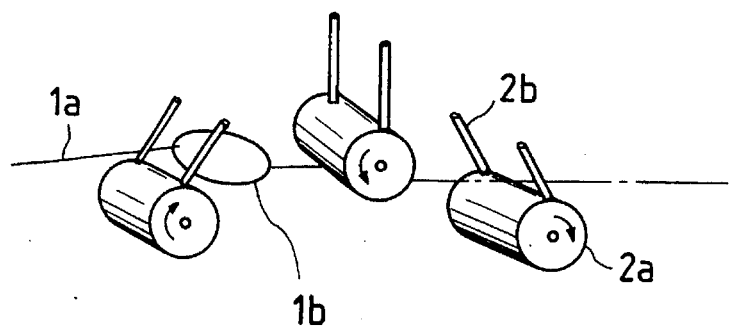
FIG. 3 is an explanatory diagram illustrating a driving device applied to the present invention.

FIG. 3 is a diagram for explaining the operation of the driving device 2 which advances the large-diameter member 1b in such a way that the large-diameter member 1b is inserted between support poles 2b attached to each roller 2a which is rotating.

With the above-mentioned apparatus shown in FIG. 1, the length of a conduit 3 has been measured. First, air was fed into a conduit by the compressor 7 so as to insert a filamentary body 1 thereinto by means of the flow of the air. The large-diameter member 1b was supported and fed by the driving device 2 shown in FIG. 3 so that the filamentary body 1 was drawn out from the drum 6. In the above-mentioned manner, air flow of 10 m/second was fed into the conduit 3 and the work was completed in 20 minutes after starting insertion of the filamentary body 1. It was possible to receive the sound of the air flow from the microphone on the forward end through the conductors in the wire 1a during the insertion, and it was also possible to confirm the arrival of the forward end at the outlet-side manhole 4 with the air flow weaken. Further, if the conduit 3 is crushed or broken on the way so as to allow clay and so on to come into the conduit 3, the size or tone of the sound is so changed that the state of the conduit 3 can be also diagnosed at the same time. If not only the microphone but also a whistle for generating a sound in accordance with the air flow are provided in parallel, it is possible to distinguish more clearly.

On the other hand, the air flow was stopped to try to pull back the filamentary body 1, but the resistance was so large that the filamentary body 1 could not be moved even by application of tension of not smaller than 10 kg. Then, when the air flow of 10 m/second was fed thereto again, the filamentary body 1 could be pulled back with 7 kg at maximum in spite of the direction contrary to that of the air flow.

Figure 5:
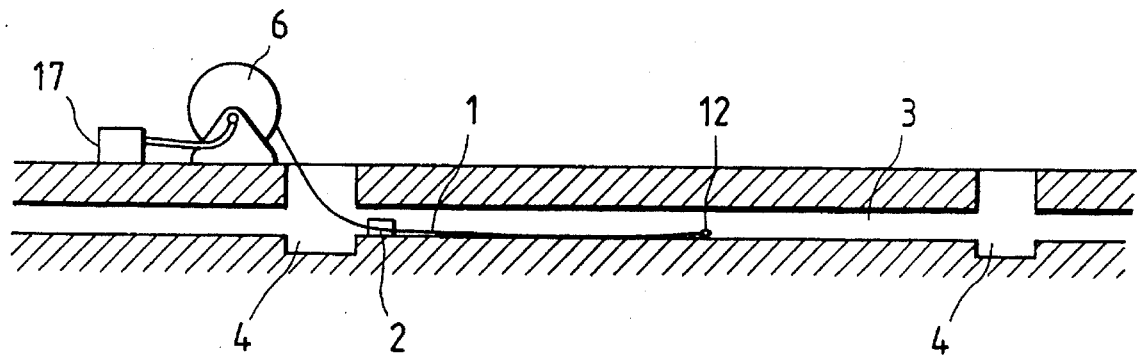
FIG. 5 is a schematic view illustrating a conduit length measuring apparatus according to another embodiment of the present invention.

FIG. 5 illustrates an apparatus for measuring the length of a conduit 3 according to another embodiment of the present invention. The same parts in description of the drawings are referenced correspondingly, and the description will not be repeated.

In FIG. 5, reference numeral 1 represents a filamentary body made by fiber reinforced plastic having an outer diameter of 8 mm including a metal communication line; 12, a small microphone attached to the forward end of the filamentary body 1; 3, a conduit constituted by a hard vinyl circular pipe of inner diameter 75 mm; 4, manholes; 2, a caterpillar-type driving device for pushing the filamentary body 1 into the conduit 3; 6, a drum; and 17, a receiving device for amplifying and indicating a signal from the microphone 12 through the communication line. The conduit 3 is buried over a distance of 100 m between the manholes 4 and 4 at a depth of 1 m under the ground.

The filamentary body 1 having rigidity is drawn out from the drum 6 by the driving device 2, and pushed into the conduit 3. At this time, the filamentary body 1 is pushed while contacting with the inner wall of the conduit 3, so that a sound is generated. This sound is received by the microphone 12, and transmitted to the receiving device 17 through the built-in communication line. When the forward end of the filamentary body 1 has arrived at the outlet-side manhole 4, the forward end portion thereof is out of contact with the inner wall of the conduit 3 so that the signal level is reduced to make it possible to confirm the insertion. Further, in the case where the conduit 3 is broken on the way so as to allow clay or the like to enter therein, the size or tone of the sound is so changed that the state of the conduit 3 can be also diagnosed at the same time.

Figure 6:
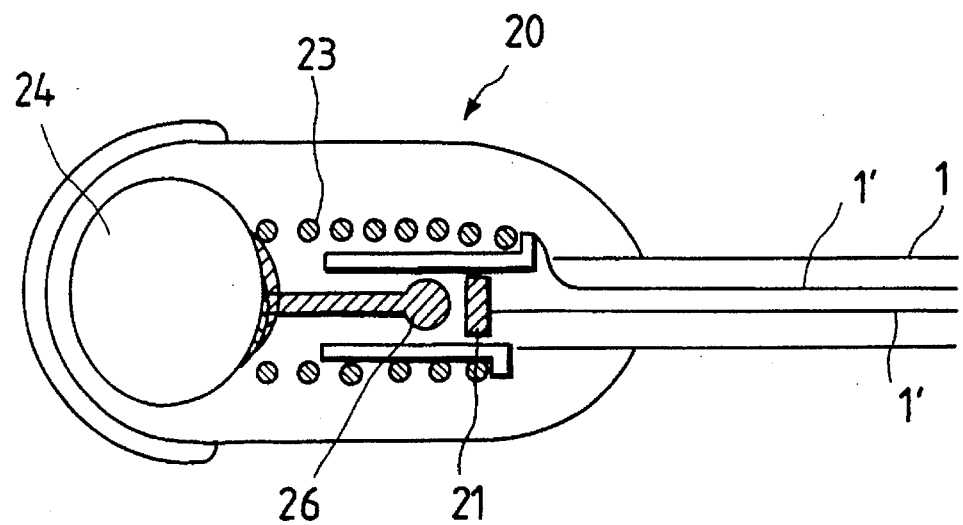
FIG. 6 is a sectional view illustrating the configuration of a switch to be applied to the embodiment.

FIG. 6 is a sectional view illustrating the configuration of a switch attached to the forward end of a filamentary body. The case of providing a switch 20 in place of the microphone 12 attached to the forward end of the filamentary body 1 in FIG. 1 will be described.

In the switch 20, a contact 21 is connected to one end of a metal communication line 1' built in the filamentary body 1, the other end of the communication line 1' being connected to a spring 23. A contact 26, which is attached to a wind receiving portion 24, is fixed to the other end of the spring 23. In the conduit 3, the wind receiving portion 24 is pulled against the spring 23 by the air flow so that the contacts 21 and 26 are separated from each other as shown, and then the OFF state of the switch 20 is indicated as a result of observation by the receiving device 17 through the communication line 1'. However, if the forward end of the filamentary body 1 arrives at the outlet-side manhole 4, the air flow will be weak suddenly so as to increase the force of the spring 23 relatively, so that the contacts 21 and 26 will be in contact with each other, and the ON state of the switch 20 is indicated by the receiving device 17.

Therefore, if a filamentary body 1 is inserted into a conduit 3, initially the receiving device 17 indicates the OFF state of the switch 20, and thereafter the switch 20 will change from the OFF state to the ON state if the forward end of the filamentary body 1 arrives at an outlet-side manhole 4, so that it can be confirmed that the filamentary body 1 has been inserted.

In such a manner, an experiment that the filamentary body 1 is inserted into a conduit 3 has been conducted. The OFF state of the switch 20 was indicated while the filamentary body 1 was advancing in the conduit 3, and the ON state was sometimes indicated because of contact of the forward end of the switch 20 against the inner wall of the conduit 3 or the like. However, the indication of the ON state returned to the OFF state soon, and the ON state was indicated stationarily after the filamentary body 1 had arrived at the outlet-side manhole 4.

Besides the above-mentioned embodiment, from the point of view of the difference of temperature arising between the conduit 3 and the manhole 4, which has been confirmed, the same object can be attained with a thermocouple employed as a sensor 12. Alternatively, if a transponder, for example, made by Texas Instruments Inc., is attached to the forward end of the filamentary body 1, the same object can be also attained by detecting a response radio wave from the transponder.

Figure 7:
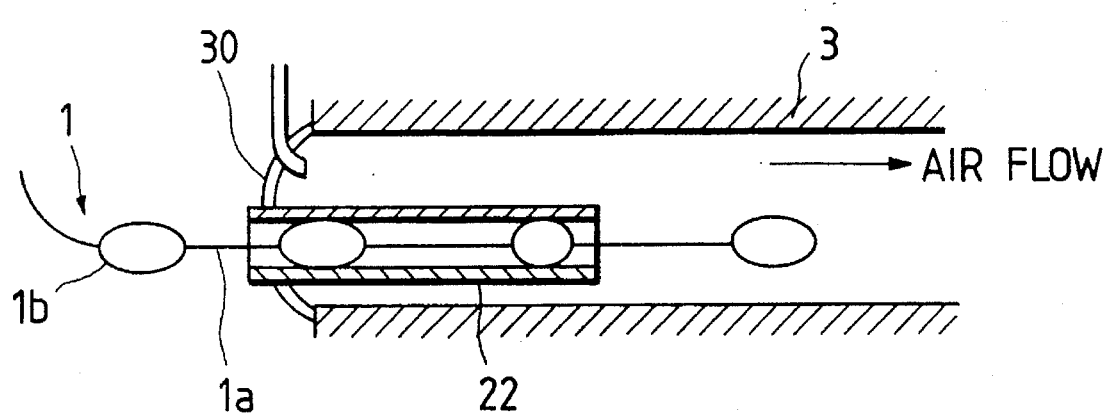
FIG. 7 is an enlarged diagram illustrating the configuration of the inlet of a conduit according to the present invention.

FIG. 7 is an enlarged diagram illustrating the configuration of the inlet of a conduit according to the present invention.

In FIG. 7, a seal 30 is provided on the inlet side of the conduit 3 in such a manner that air, which is fed into the conduit 3 by means of the compressor 7, is prevented from flowing backward. The filamentary body 1, which is drawn out from the drum 6, is fed into the conduit 3 through a guide pipe 22 which passes through the seal 30. The guide pipe 22 has an inner diameter of 36 mm and a length of 6 m, and is provided at the inlet of the conduit 3, and the length of the guide pipe 22 is selected such that when one of the large-diameter members 1b of the filamentary body 1 is fed from the guide pipe 22 into conduit 3, the next one large-diameter member 1b enters the inside of the guide pipe 22 so that there is no fear that the air flow leaks into the inlet-side manhole 4.

With the above-mentioned apparatus, air flow of 10 m/sec was fed into a conduit 3 to thereby insert a filamentary body 1 into the conduit 3. As a result, the work could be completed in five minutes. It was possible to receive the sound of the air flow from the microphone on the forward end of the filamentary body 1 through the conductors in the wire 1a during the insertion, and it was also possible to confirm the arrival of the forward end at the outlet-side manhole with the air flow weaken.

Figure 8A:
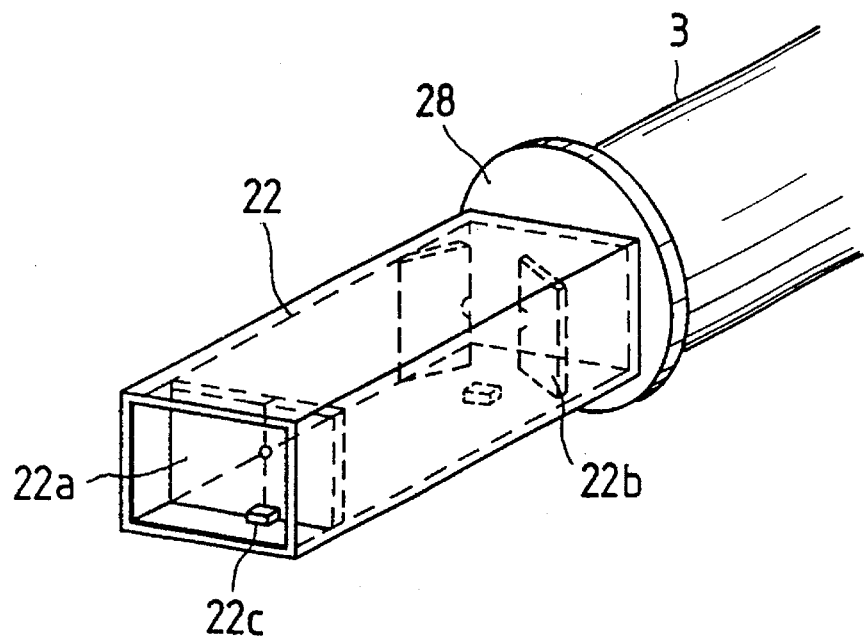
FIGS. 8(a) and 8(b) are a perspective diagram illustrating a guide pipe according to other embodiments of the present invention, respectively.

FIGS. 8(a) is a perspective view illustrating the structure of a guide pipe according to another embodiment of the present invention. In FIG. 8(a), openable/closable doors 22a and 22b are provided at a certain interval so that the door 22a is opened when one large-diameter member 1b of the filamentary body 1 passes therethrough and closed when the large-diameter member 1b has passed therethrough. The next door 22b is opened/closed in the same manner. Clasps 22c are provided so as to be capable of preventing the respective doors 22a and 22b from opening in the direction opposite to the passing direction of the filamentary body 1. The interval between the two doors 22a and 22b is selected to be different from the interval between the large-diameter members 1b so that either one of the two doors 22a and 22b is always closed to thereby prevent the air in the conduit 3 provided through a flange 28 from flowing backward. In view of this, preferably, one of the doors 22a and 22b is provided so as to be movable in the longitudinal direction of the filamentary body 1. The above-mentioned doors 22a and 22b are shown merely by way of example, and the present invention is not limited to the shape, the number and so on of the illustrated doors.

Figure 8B:
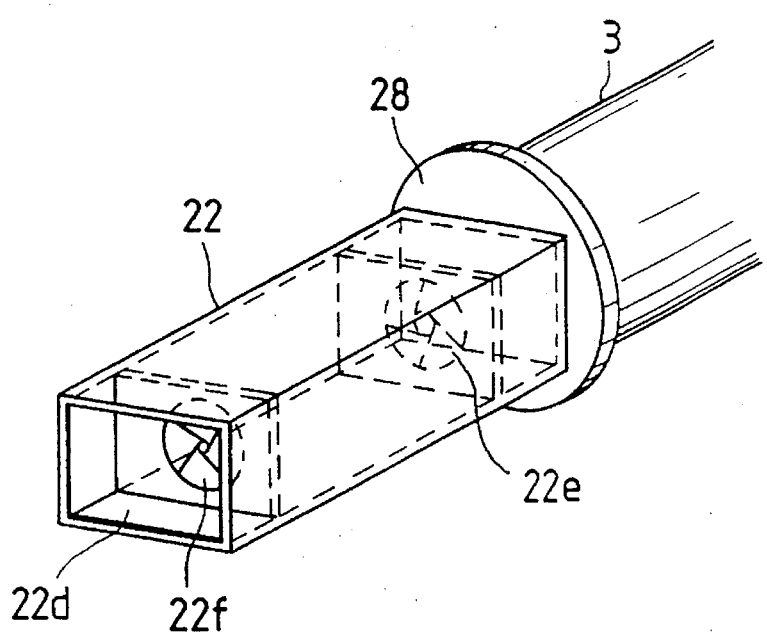

FIG. 8(b) is a perspective view illustrating the structure of another guide pipe, in which the doors 22a and 22b are replaced by shutters 22d and 22e. Each of the shutters 22d and 22e has a central aperture which is changed by opening/closing a plurality of plates 22f so that the aperture is opened when the large-diameter member 1b of the filamentary body 1 passes therethrough, while closed after the large-diameter member 1b has passed. If a noncontacting switch is provided on each door or shutter, the filamentary body 1 can be inserted smoothly by controlling the door or shutter so that the door or shutter is opened when the large-diameter member 1b comes up thereto, and closed after the large-diameter member 1b has passed. Though the large-diameter member 1b of the filamentary body 1 cannot pass through the door or shutter when it is closed, the wire 1a of the filamentary body 1 can be inserted through a small hole.

In the above-mentioned embodiments, it was recognized by the inventors that a total of force exerted on the large-diameter members 1b is proportional to the number of the large-diameter members 1b without any influence of pressure loss due to the existence of the large-diameter members 1b when the conduit 3 has a length of 500 m or less and an inner diameter of 60–120 mm, the diameter of the large-diameter members 1b is between 15 mm and 45 mm, and an interval between the adjacent large-diameter members 1b is 30 cm or more. For that reason, if an interval at which the large-diameter members 1b are disposed is made narrower, then the large forwarding force for the large-diameter members 1b can be obtained. When an air blower put on the market is used, air having a flow rate of 1000–3000 liter/minute can be utilized, thereby saving costs in equipment. However, in this case, an interval between the large-diameter members 1b is preferably selected to 30–500 cm under the above-mentioned conditions. In particular, if the interval is set to 1 m or less, there can be obtained a forwarding force capable of allowing the filamentary body 1 to pass through the conduit 3 having a length of 100 m within 3 minutes.

As has been described, according to the present invention, air is fed into a conduit to insert a filamentary body into the conduit by means of the flow of this air to thereby measure the length of the conduit. Light large-diameter members having predetermined size are attached to the filamentary body to thereby increase the force of propelling the filamentary body as well as give vibration to the filamentary body by disturbing the air, so that the filamentary body can be inserted smoothly without any problem such as encroaching of the wire even if any laid cables exist in the conduit. Further, if a sensor or an oscillation element is attached to the forward end of the filamentary body to detect a signal from the forward end, it is possible to surely insert the filamentary body into the conduit even if the conduit is narrow and long. With such a method to measure the conduit length, it is possible to manufacture cables having connectors attached to their opposite ends, and to lay the cables in the conduit.

Also, according to the present invention, a sound produced when a filamentary body is pushed into a conduit while contacting with an inner wall of the conduit is detected through a microphone attached to the forward end of the filamentary body, so that the change of the state inside the conduit can be diagnosed.

Further, according to the present invention, a guide pipe is provided at the inlet of the conduit, in such a manner that the filamentary body is fed through the guide pipe so that the air flow is prevented from flowing backward and leaking out in the vicinity of the inlet, and further the filamentary body is fed into the conduit from the guide pipe in the place where the air flow is stable, so that the filamentary body can receive a stable propellant force.

What is claimed is:

1. A method of measuring a length of a conduit, comprising the steps of:

supplying air into said conduit to insert a filamentary body into said conduit by means of air flow, wherein said filamentary body comprises a wire and a plurality of large-diameter members attached to said wire at predetermined intervals, said plurality of large-diameter members providing an outermost surface of the filamentary body;

detecting arrival of a forward end of said filamentary body at an outlet of said conduit; and determining the length of said conduit from the length of said filamentary body inserted into said conduit.

2. A method as claimed in claim 1, wherein said detecting step comprises detecting a sound of air flow in said conduit by a microphone attached to the forward end of said filamentary body.

3. A method as claimed in claim 1, wherein said detecting step comprises detecting intensity of the air flow in said conduit by a sensor attached to the forward end of said filamentary body.

4. A method of measuring a length of a conduit, comprising the steps of:

inserting a filamentary body into said conduit by a driving device, wherein said filamentary body comprises a wire and a plurality of large diameter members attached to said wire at predetermined intervals, said plurality of large-diameter members providing an outermost surface of the filamentary body;

detecting sound by means of a microphone attached to the forward end of said filamentary body; and measuring the length of said filamentary body when a detected sound changes; and determining the length of said conduit from the length of said filamentary body.

* * * * *